United States Patent [19]

Walter et al.

[11] Patent Number: 4,610,646
[45] Date of Patent: Sep. 9, 1986

[54] ROLLER, ESPECIALLY A TENSION ROLLER FOR A BELT DRIVE

[75] Inventors: Lothar Walter, Schweinfurt; Manfred Brandenstein, Eussenheim; Armin Olschewski, Schweinfurt, all of Fed. Rep. of Germany

[73] Assignee: Skf Kugellagerfabriken GmbH, Schweinfurt, Fed. Rep. of Germany

[21] Appl. No.: 295,248

[22] Filed: Aug. 24, 1981

[30] Foreign Application Priority Data

Sep. 27, 1980 [DE] Fed. Rep. of Germany ....... 8025902

[51] Int. Cl.⁴ .......................... F16H 7/20; F16H 55/36
[52] U.S. Cl. ..................................... 474/198; 474/174; 474/197
[58] Field of Search ............... 474/198, 197, 165, 181, 474/182, 184, 179, 176, 174

[56] References Cited

U.S. PATENT DOCUMENTS

| | | | |
|---|---|---|---|
| 839,596 | 12/1906 | Johnston | 474/199 |
| 1,782,622 | 11/1930 | Kilian | 308/196 |
| 3,415,500 | 12/1968 | Pethis | 308/184 R |
| 3,772,928 | 11/1973 | Gobeille | 474/174 |
| 3,950,046 | 4/1976 | Lubbersmeyer | 474/199 |
| 4,033,196 | 7/1977 | Maeda | 474/199 |

FOREIGN PATENT DOCUMENTS

| | | | |
|---|---|---|---|
| 977298 | 11/1975 | Canada | 474/181 |
| 144461 | 6/1920 | United Kingdom | 474/197 |

Primary Examiner—Kenneth J. Dorner
Assistant Examiner—Mike Bednarek
Attorney, Agent, or Firm—Yuter, Rosen & Dainow

[57] ABSTRACT

A roller, especially a tension roller for a belt drive has a hollow hub supporting a rolling bearing, with a pulley or rotating body supported on the outer ring of the bearing. The hollow hub has at least one closed end, with a mounting hole therethrough to enable mounting to a machine frame. The closed end or bottom of the hub is setback from the adjoining facing end of the hub, by an axially projecting annular rim. The hub may be formed of one part, or of two parts, each having a setback closed bottom.

8 Claims, 2 Drawing Figures

ROLLER, ESPECIALLY A TENSION ROLLER FOR A BELT DRIVE

BACKGROUND OF THE INVENTION

This invention relates to rollers and pulleys, especially to tension rollers for belt drive or the like, comprised of a hollow body having at least one bottom closed and defining a hub, wherein the roller is held to a machine frame or the like by means of a screw extending through a bore in the bottom of the hub and thread into the machine frame. Such an arrangement further includes a rotating body, such as a pulley wheel, supported by a rolling bearing on the hub.

Rollers for belt drives are known in which the hub for the roller is comprised of a hollow body, the hub being affixed to a machine frame by means of a screw, and wherein a rotatable body such as a pulley wheel is mounted on a rolling bearing supported by the hub. In a known arrangement of this type the head of the screw extends axially beyond the end surface of the hollow body, so that a mounting tool can be easily employed to engage the screw.

This is also the case in another known tension roller, (DE-GM7328570), wherein the hub directly forms the inner bearing ring of the rolling bearing. In this arrangement the hub is detachably affixed to the machine part by means of a screw extending eccentrically through the hub. The belt tension may be adjusted by the provision of an adjusting surface on the hub adapted to be engaged by an adjusting device, such as a key surface, by turning of the hub about the eccentrically mounted screw. The hub is formed of a hollow body which has a guide element on one or both sides having eccentrically displaced bores, so that the hollow body can be rotatably adjusted about the axis of the screw.

Due to the protruding screw heads the width of the known roller arrangement is relatively large, so that such arrangements frequently cannot be employed due to their space requirements. In addition, the danger arises that connecting parts or adjacent machine parts can contact or collide with the protruding parts and thereby may result in objectionable deformation to the device.

The present invention is therefore directed to the provision of a roller, especially a tension roller for belt drive or the like, wherein the width of the roller is relatively small, so that it can be employed in locations of relatively narrow space. In addition, the invention is directed to the provision of an arrangement wherein the touching or colliding of the roller arrangement with adjacent parts, and thereby the possibly resultant deformation, is avoided.

Briefly stated, in accordance with the invention, the above object is achieved by providing a roller arrangement wherein the bottom of the hollow body or bodies defining the hub are setback from the axially outer facing surface by an axially projecting annular rim, the setback being at least as large as the wall thickness of the bottom. As a result on the one hand the screw heads are displaced further inwardly, and on the other hand, the bottom of the hollow body is stiffened. Preferably, in accordance with a further feature of the invention, the bottom of the hollow body is setback from the axially outer facing surface of the hollow body distance about the height of the head of the screw. As a result, the contact surface of the bottom of the hub with the head of the screw is setback sufficiently far that the head does not axially project beyond the hub. As a consequence, the screw may be shorter, and the distance from the holding point of the machine frame is shorter, such that the loading conditions are affected positively. The hollow body can be produced from a cup or can shaped body, by a drawing process so that the hollow body is stiffened by the resulting double fold in the material. In addition the setback contributes to the alignment of the rolling bearing.

In accordance with a further feature of the invention, the inner race of the rolling bearing can be formed directly in the outer surface of the hollow body. Alternatively, however, the inner ring of the rolling bearing, carrying the inner race, may be separate and mounted on the outer surface of the hollow body.

In the latter case it is advantageous to prepare the hollow body from two cylindrical sleeves inserted in the bore of the rolling bearing from opposite sides. These sleeves can contact one another with their facing sides, although it is alternatively possible to provide at least one of the sleeves with a continuous or interrupted radially extending shoulder on its surface which engages the facing surface of the inner ring, for support of the bearing.

In the formation of the hollow body from two sleeves each having one side closed, in accordance a further feature of the invention the bottom of both of the sleeves are setback by axially projecting annular rims from the respective axially outer end surfaces. In the latter case the axially extending annular rims of that sleeve facing the machine frame can be used as a centering surface, cooperating with a centering projection on the machine frame. As a result, the centering or accurate positioning of the roller on the machine frame is obtained without the necessity of widening the roller.

Since both sleeves can be formed with different widths, the distance between the central plane of the roller to the machine frame can be varied, by reversing the mounting position and the roller.

In accordance with a still further feature of the invention, a ring or the like of vibration damping material may be mounted in the hollow space between the projecting annular rim and bottom of the sleeve directed toward the machine frame, and the machine frame itself. This feature results in the damping of the vibrations between the roller and the machine frame.

BRIEF DESCRIPTION OF THE DRAWINGS

In order that the invention will be more clearly understood, it will now be disclosed in greater detail with reference to the accompanying drawings, wherein.

Figure 1:
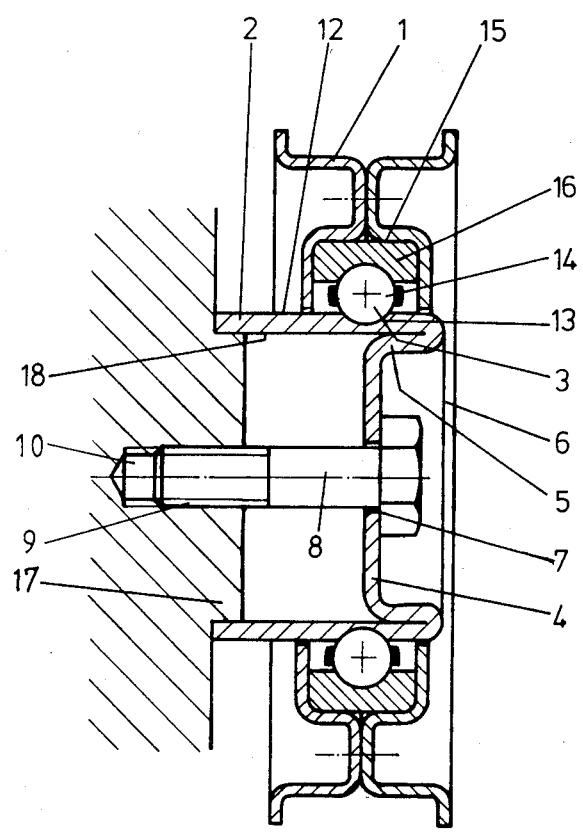
FIG. 1 is a cross-sectional view of a pulley in accordance with the invention, employing a single part hub.

The pulley of FIG. 1 consists of a rotating body 1, and a rolling bearing 3 arranged between the rotating body 1 and the hub 2. The hub is in the form of a sleeve having one closed end, forming a bottom 4. The bottom 4 is setback from the facing end surface 6 of the hub by an axially extending annular rim 5. The bottom 4 has a central hole 7 therein, through which a screw 8 extends. The threads 9 of the screw engage the corresponding threads in bore 10 in machine frame 11, so that the hub 2 and the pulley are affixed to the machine frame 11.

The outer surface 12 of the hub is sleeve shaped, and the inner race 13 for the balls 14 of the rotating body of the rotatably supported roller bearing 3 are formed directly in its outer surface 12. The pulley is formed of two side parts axially held together, defining an annular groove for a belt. Both parts of the pulley or rotating body are attached to the outer surface 15 of the outer ring of the bearing 3, and are connected to one another by rivets (not shown) or by welding. The machine frame 11 has a cylindrical projection 17 coaxial with the threaded hole 10. The cylindrical outer surface of the projection 17 extends into and engages the cylindrical bore 18 of the hub 2 and thereby secures the position of the pulley with respect to the machine frame.

Figure 2:
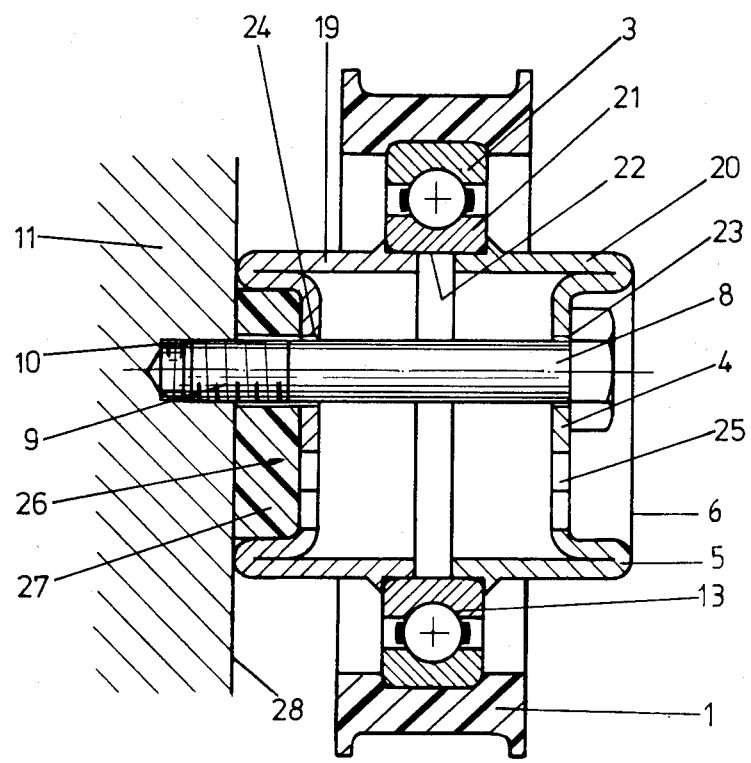
FIG. 2 is a cross-sectional view of a tension roller in accordance with another embodiment of the invention employing a two part hub.

The tension roller of FIG. 2 is comprised of a rotating body 1, two sleeves 19 and 20 affixed together to form the hub 2, and a bearing 3 having an inner ring 21 with a race therein. The two sleeves 19 and 20 which are inserted in the bore 22 of the inner ring 21, each sleeve having a bottom 4. The respective bottoms are joined to axially projecting annular rims, so that they are setback from the respective facing end surfaces 6 of the sleeves. In this example the bottoms 4 of the two sleeves are provided with aligned eccentric bores 23 and 24 respectively, and a screw 8 extends through these holes and has an end 9 threaded in the threaded hole 10 of the machine frame 11. The bottoms 4 of the sleeves 19 and 20 have aligned key surfaces 25 which serve as engaging surfaces for an adjustment tool (not shown). The adjustment tool enables the turning of the hub 2 about the screw 8, to thereby adjust the tension of a belt (not shown) running on the outer surface of the rotating body 1. A piece 27 of vibration damping material is installed in the hollow space 26 between the projecting annular rim 5 and the bottom 4 of the sleeve 19 toward the machine frame 11, under compression between the facing surface 28 of the machine frame 11 and the respective bottom 4. This piece 27 inhibits the transmission of vibration from the hub 2 of the tension roller to the machine frame.

While the invention has been disclosed with reference to a limited number of embodiments, it will be apparent that variations and modifications be made therein. It is therefore entered in the following claims to cover each such variation and modification as falls within the true spirit and scope of the invention.

What is claimed is:

1. In a roller assembly comprised of a hollow hub comprised of a cylindrical sleeve having a closed end forming a bottom wall with an aperture extending therethrough for a receiving a mounting screw, a rotatable roller, and rolling bearing means supporting said roller on said hub; the improvement where said hub has an end surface, said bottom wall being set back from said end surface a distance at least equal to the wall thickness of said bottom wall, the periphery of said bottom wall being joined to said end surface by an axially extending annular rim, said axially extending annular rim defining a stiffening double fold in the material of said cylindrical sleeve, the folds of said double fold being in substantial contact one with the other along a cylindrical axial surface.

2. The roller assembly of claim 1 further comprising a screw extending through said aperture in said bottom wall and having a head on the end therefore toward said end surface of said hub, the setback of said bottom wall from said end surface being not greater than the height of said head.

3. The roller assembly of claim 1 wherein an inner race for said rolling bearing means is formed directly in the outer surface of said hub.

4. A roller assembly comprising:
a hollow hub including a cylindrical sleeve, said sleeve having a closed end forming a bottom wall with an aperture extending therethrough for receiving a mounting screw, said hub having an end surface, said bottom wall being set back from said end surface a distance at least equal to the wall thickness of said bottom wall, the periphery of said bottom wall being joined to said end surface by an axially extending annular rim, and a second cylindrical sleeve having a closed end forming a second bottom wall, said sleeve being coaxial with said first mentioned sleeve, said second sleeve having a second end surface, said second bottom wall being set back from said second end surface a distance at least equal to the wall thickness of said second bottom wall, the periphery of said bottom wall being joined to said second end surface by a second axially extending annular rim;
an element of vibration damping material in the space defined by the annular rim and the bottom wall of one of said sleeves;
a rotatable roller; and
rolling bearing means supporting said roller on said hub.

5. The roller assembly of claim 4 further comprising a machine frame, a screw extending through said aperture to mount said hub to said machine frame, said element of vibration damping material abutting said machine frame.

6. The roller assembly of claim 4, wherein said first and second cylindrical sleeves are positioned with said first and second ends extended in opposite axial directions.

7. A roller assembly comprising:
a hollow hub including a cylindrical sleeve having a closed end forming a bottom wall with an aperture extending therethrough for receiving a mounting screw, said sleeve having an end surface, said bottom wall being set back from said end surface by a distance at least equal to the wall thickness of said bottom wall, the periphery of said bottom wall being joined to said end surface by an axially extending annular rim;
a rotatable roller;
roller bearing means supporting said roller on said hub, said roller bearing means having an inner ring, said inner ring being mounted on the outer surface of said hub, said inner ring having a race.

8. A roller assembly comprising:
a hollow hub including a cylindrical sleeve having a closed end forming a bottom wall with an aperture extending therethrough for receiving a mounting screw, said sleeve having an end surface, said bottom wall being set back from said end surface by a distance at least equal to the wall thickness of said bottom wall, the periphery of said bottom wall being joined to said end surface by an axially extending annular rim;
a rotatable roller;
roller bearing means supporting said roller on said hub, said roller bearing means including an inner ring having an inner bore, and said hollow hub including two cylindrical sleeves inserted into said bore of said inner ring from opposite sides.

* * * * *